US009642380B1

(12) United States Patent
Mommer, Jr. et al.

(10) Patent No.: US 9,642,380 B1
(45) Date of Patent: May 9, 2017

(54) FEED PROCESSING USING SALTS OF FATTY ACIDS

(71) Applicants: Richard P. Mommer, Jr., Loveland, CO (US); Diane K. Walker, Loveland, CO (US)

(72) Inventors: Richard P. Mommer, Jr., Loveland, CO (US); Diane K. Walker, Loveland, CO (US)

(73) Assignee: Uniscope, Inc., Johnstown, CO (US)

( * ) Notice: Subject to any disclaimer, the term of this patent is extended or adjusted under 35 U.S.C. 154(b) by 0 days.

(21) Appl. No.: 13/650,114

(22) Filed: Oct. 11, 2012

Related U.S. Application Data

(60) Provisional application No. 61/546,014, filed on Oct. 11, 2011.

(51) Int. Cl.
*A23K 1/00* (2006.01)
*A23L 7/117* (2016.01)
(Continued)

(52) U.S. Cl.
CPC ............. *A23K 1/001* (2013.01); *A23K 20/30* (2016.05); *A23L 2/78* (2013.01); *A23L 7/117* (2016.08); *A23C 2230/05* (2013.01); *A23C 2230/10* (2013.01); *A23K 10/30* (2016.05); *A23K 10/40* (2016.05); *A23K 50/42* (2016.05); *A23V 2002/00* (2013.01); *C12H 1/0432* (2013.01)

(58) Field of Classification Search
CPC . A23C 9/146; A23C 9/143; A23L 2/78; A23L 1/0156; C12H 1/0432; A23V 2002/00
USPC ........................................................ 426/271
See application file for complete search history.

(56) References Cited

U.S. PATENT DOCUMENTS

| 3,682,653 A | 8/1972 | Mommer |
| 4,153,735 A | 5/1979 | Mommer |

(Continued)

OTHER PUBLICATIONS

Arbruster., "Steam Flaking Grains for Feedlot Cattle—A Consultant's Perspective". Available online at www.beefextension.com on Jun. 7, 2006.*

(Continued)

*Primary Examiner* — Erik Kashnikow
*Assistant Examiner* — Assaf Zilbering
(74) *Attorney, Agent, or Firm* — Cochran Freund & Young LLC; Samuel M. Fruend

(57) ABSTRACT

Methods for using water-soluble salts of fatty acids alone, or in chosen combinations with chelating agents, antifreeze compounds, and water for improving the processing of feed materials including whole grains or finely-divided ingredients, which may contain grain, that are mechanically processed, are described. The fatty acid salts may be added to water or to steam prior to application to feed materials, and may be applied directly to the feed materials, or added to grain conditioners known in the art to improve their performance. Treated feed materials have improved lubricity, and thin, strong durable flakes having less bulk density, and durable hard pellets, may be generated with reduced fines. Addition of an anti-freeze material permits the resulting compositions to remain fluid under freezing conditions, while oxidation or spoilage, may be reduced by adding a chelating agent. The solutions are basic and are non-corrosive.

18 Claims, 11 Drawing Sheets

(51) Int. Cl.
*A23L 2/78* (2006.01)
*A23K 20/20* (2016.01)
*C12H 1/04* (2006.01)
*A23K 10/30* (2016.01)
*A23K 50/42* (2016.01)
*A23K 10/40* (2016.01)

(56) References Cited

U.S. PATENT DOCUMENTS

| | | | |
|---|---|---|---|
| 4,657,766 A | | 4/1987 | Goodall |
| 4,772,479 A | | 9/1988 | Goodall |
| 4,828,860 A | | 5/1989 | Goodall |
| 4,896,993 A | | 1/1990 | Bohnhoff |
| 4,986,993 A | * | 1/1991 | Chanen .......................... 426/93 |
| 5,139,779 A | | 8/1992 | McNeff |
| 5,198,253 A | * | 3/1993 | Roskowiak et al. ............ 426/93 |
| 5,240,727 A | | 8/1993 | McNeff |
| 5,279,838 A | | 1/1994 | McNeff |
| 5,518,750 A | | 5/1996 | Mcneff |
| 5,662,901 A | | 9/1997 | Tobey, Jr. et al. |
| 7,153,735 B2 | * | 12/2006 | Sashida ......................... 438/239 |
| 2008/0220972 A1 | * | 9/2008 | Kirby et al. .................. 504/234 |

OTHER PUBLICATIONS

"Fatty Acid Composition of Some Major Oils". Available online at www.chempro.in on Jan. 16, 2007.*

Willett et al., "Ruminant or industrial sources of trans fatty acids: public health issue or food label skirmish?" American Journal of Clinical Nutrition vol. 87, pp. 515-516 (2008).*

"Health Benefits". Available online at www.trianglebranch.net on Oct. 25, 2009.*

Kris-Etherton et al., "Individual Fatty Acid Effects on Plasma Lipids and Lipoproteins". American Journal of Clinical Nutrition 65, pp. 1628-1644 (1997).*

"Omega-9 Fatty Acids (Oleic Acid)". Available online at www.orthomolecular.org on Apr. 1, 2002.*

Brown., "Soapstock in Ruminant Diets". Available online at www.mix30.com in 2006.*

* cited by examiner

FEED PROCESSING USING SALTS OF FATTY ACIDS

CROSS-REFERENCE TO RELATED APPLICATIONS

The present application claims the benefit of U.S. Provisional Patent Application No. 61/546,014 for "Feed Processing Using Salts Of Fatty Acids" which was filed on Oct. 11, 2011, the entire contents of which is hereby specifically incorporated by reference herein for all that it discloses and teaches.

FIELD OF THE INVENTION

The present invention relates generally to processing feed and, more particularly, to conditioning whole or finely-divided feed for improving mechanical processing thereof, including dry rolling, steam flaking, pelleting, extruding, and milling, as examples, and for improving the quality of the final product.

BACKGROUND OF THE INVENTION

Dry processing grain having low moisture content (<10%) results in shattered or poorly processed product since the kernels are hard and brittle. Adding moisture to the grain softens the kernels, making the grain easier to roll, pellet, extrude, and mill, as well as producing a higher quality product.

Grain conditioners are materials added to the grain to increase moisture uptake from water and/or steam and soften the grain before or during processing. Examples of conditioners that have been used to improve moisture absorption include lecithin, lignosulfonate, surfactants, sarsasponin, *yucca* extracts, and enzymes. Use of conditioners decreases energy use of feed mill apparatus, increases the life of the rollers and other mechanical processing devices, and increases the rate of grain processing. Some conditioners are designed with an additional function of improving the quality and digestibility of the conditioned grain by breaking down the seed coat of the grain and making the starch more available.

Grain conditioning may also refer to spraying grain kernels with water before they are milled or otherwise processed for rendering the grain tougher and less brittle, and processing may be as simple as attaching a garden hose to a grain auger, to using sophisticated apparatus in large feed manufacturing plants having conveyors and horizontal cross augers. Feed manufacturers generally increase the moisture content of grains to between 12 wt. % and 25 wt. % using a conditioning process.

Additives for improving the lubricity of feed materials while remaining on the surface thereof have been described.

SUMMARY OF THE INVENTION

Embodiments of the present invention overcome the disadvantages and limitations of the prior art by providing a method for improving the processing of whole grains and finely-divided ingredients, which may include grain, that are dry rolled, steam flaked pelleted, extruded, ground, or milled.

Another object of embodiments of the present invention is to provide a method for generating thin, strong, durable grain flakes having low bushel weight (less bulk density), and reduced fines.

Yet another object of embodiments of the present invention is to provide a method for generating durable, hard feed pellets.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purposes of the present invention, as embodied and broadly described herein, the method for improving the processing of feed materials comprising whole grains or finely-divided ingredients, hereof, includes: applying water-soluble salts of fatty acids alone, or in selected combinations with chelating agents, antifreeze compounds, and water to the feed material; and processing the feed material using mechanical procedures including dry-rolling, steam flaking, pelleting, extruding, grinding, and milling; whereby water absorption and lubricity of the feed material is increased.

In another aspect of the present invention and in accordance with its objects and purposes, the method for improving the processing of feed material comprising whole grains or finely-divided ingredients, hereof, includes: adding water-soluble salts of fatty acids alone, or in selected combinations with chelating agents, antifreeze compounds and water, to water or to steam; applying the water or steam to the feed material; and processing the feed material using mechanical procedures including dry-rolling, steam flaking, pelleting, extruding, grinding, and milling; whereby water absorption and lubricity of the feed material is increased.

Benefits and advantages of embodiments of the present invention include, but are not limited to, providing a method for improving the processing of feed material comprising whole grains and finely-divided ingredients which may contain grain, that are dry-rolled, steam flaked, pelleted, extruded, ground, or milled, as examples, and for generating strong, durable flakes and pellets with reduced fines. The flakes produced are thin and have low bushel weight.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 4A is a flow diagram illustrating batch preparation of soluble salts of fatty acids, while FIG. 4B 4A is a flow diagram illustrating continuous flow preparation of soluble salts of fatty acids.

DETAILED DESCRIPTION OF THE INVENTION

Figure 1A:
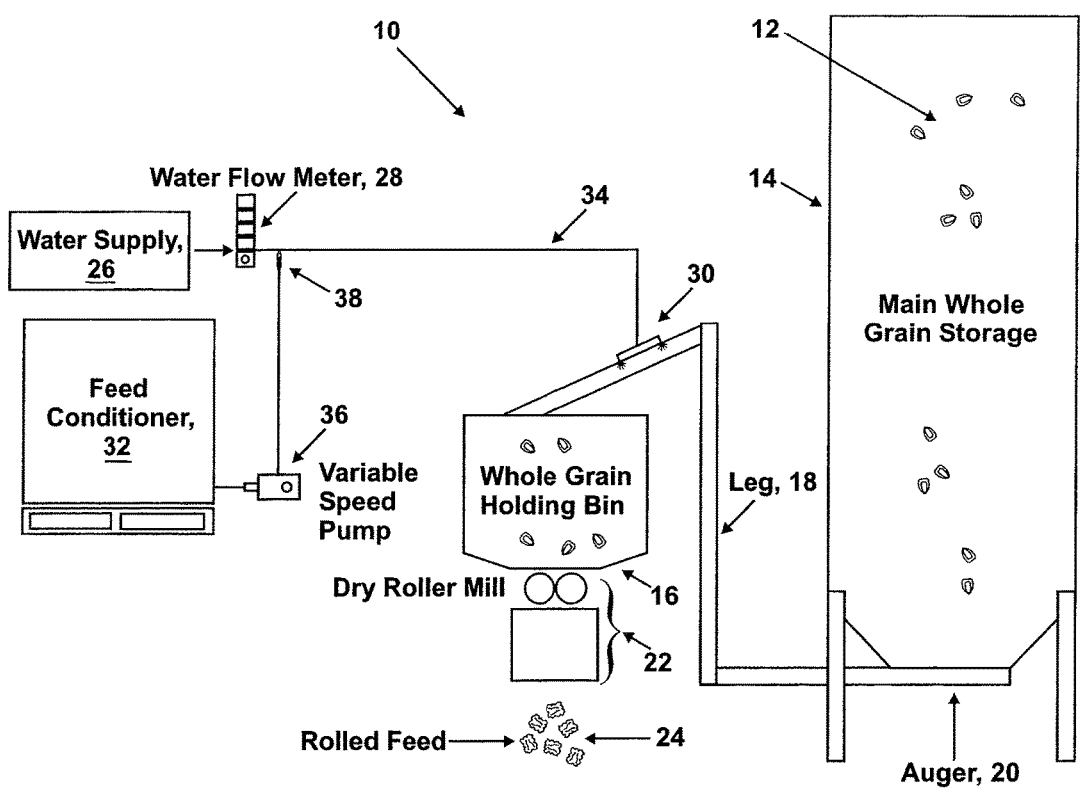
FIG. 1A is a schematic representation of an apparatus for dry rolling grains, the conditioner of the present invention being added into the water before the rolling process.

Briefly, embodiments of the present invention include methods for using water-soluble salts of fatty acids alone, or in various combinations with chelating agents, antifreeze compounds, and water for improving the processing of feed material comprising whole grains or finely-divided ingredients which may include grain, that are pelleted, extruded, dry-rolled, steam flaked, ground, or milled, as examples. The water-soluble salts of fatty acids penetrate the feed material rather than remaining on the surface thereof, while improving the lubricity of the feed material. Water absorption of the feed material is increased as demonstrated by achieving equal water absorption in a shorter treatment time when compared to water alone, or a higher total moisture absorption level for the same treatment time. Water absorption in the pelleted and extruded materials is also made more facile. The addition of hydrogenated lipids and/or anionic polymers is not required to achieve the improved water absorption and lubricity of the feed material, nor for the generation of a thinner, strong, and durable flaked feed material having low bushel weight, and for the generation of durable hard feed pellets with reduced fines.

Embodiments of the method include the addition of the fatty acid salts to water or to steam prior to application to finely-divided ingredients or to whole grains. The salts of fatty acid contain about 5% of water in their dry form. However, in what follows, the terms "salts of fatty acids" and "salt of a fatty acid" contain greater than about 30 wt. % of water and more typically between approximately 55 wt. % and about 70 wt. % of water, and do not have to be further diluted with water or mixed with other materials to be applied directly to the grain. Such salts may be obtained by adding an appropriate quantity of water to the dry salt. In some embodiments, water may be added and/or the salts of fatty acids may be dispersed onto the feed material using a sprayer or introduced into a steam line for application to the feed material. Treated grains or finely-divided ingredients which may include grains, have improved lubricity which leads to lower processing power and current requirements, generates durable, hard pellets, and produces thin, strong, durable flakes having low bushel weight (less bulk density), with reduced fines. Addition of an anti-freeze material to fatty acid salts permits the resulting composition to remain fluid under freezing conditions, while product deterioration may be significantly reduced by adding a chelating agent, thereby extending the working life of the fatty acid salt solution. The solutions are basic and are non-corrosive.

In what follows, salts of fatty acids having greater than about 30 wt. % of water, or mixed with any combination of water, chelating agents or antifreeze materials will be termed a "conditioning agent" or "conditioner." The term "grain" as used herein is intended to include the seeds or seedlike fruits of the cereal grasses, such as wheat, barley, corn, oats, rice, millet, and the like, as well as the grains, seeds or ovules of plants normally used for sowing, but have utility as animal feed. "Animal feed" or "feed" as used herein includes feed for animals, fish, and birds, and includes feed for humans. Animal feed may include the ingredients, soya bean meal, distillers' grains, fish meal, meat meal, molasses, fats, oil, minerals, vitamins, or other ingredients, such as grass or grass seed, hay, alfalfa, grain and other hulls, and grain by-products, as examples, in addition to one or more grains. Whole grains as well as finely-ground or otherwise obtained ingredient particles which may contain grains are also included in the term feed. The term "amperage" as used throughout, means current in amperes.

Information used to evaluate production performance of the equipment includes motor amperage for driving the principal rollers in a flaking apparatus, rollers and dies in pellet mills, and screws and dies in extruders. The number of tons of product generated in 1 h is also used as a performance indicator. Durability or hardness may be determined using the Kansas State University Tumbling Can Method (ASAE Standard S269.3), where 500 g of flaked, pelleted, or extruded feed is placed in a 500 cubic inch can and tumbled 500 times. The fines are extracted by sieving, and the balance weighed from which the weight percent of flake, pellets and extrudate, and the weight percent of fines are determined. This test method was designed to replicate mechanical handling of finished product from the point of processing to delivery to an animal or human, including transportation, storage and dispersal.

The present method may utilize at least one salt of a fatty acid applied to the animal feed, or use salts having a mixture of various fatty acid chain lengths, including both saturated and unsaturated fatty acids. Examples of fatty acid salts may include: ammonium, potassium, or sodium salts of oleic acid, and those of vegetable oils containing significant portions of oleic acid, such as corn, cottonseed, palm oil oleate, safflower, and soybean oils. Other examples include shorter chain lauric acid oils, such as coconut and palm kernel. The use of shorter chain oils enhances foaming and dispersion of the resulting salts of fatty acids when applied to the animal feed. Embodiments of the invention may include blends of oils, as well as blends containing tallow, lard or grease, palm oil, or tall oil. All of these salts of fatty acids are readily soluble and suitable for use with animal feed.

In an embodiment of the method, the at least one salt of a fatty acid is mixed with water; that is, 5 wt % to 95 wt. % of salts of fatty acids are mixed with 5 wt % to 95 wt % of water to improve the flowability of the salts of the fatty acid before application to the feed. Zero weight percent to 40 wt % of ethanol, propylene glycol, calcium chloride or other anti-freezing composition may be mixed with the resulting solution to prevent freezing thereof. Zero weight percent to 3 wt % of at least one chelating agent, such as disodium ethylenediaminetetraacetate dihydrate, may be added to the solution to prevent rancidity, protect the color, and prevent oxidation of the solution, thereby extending the working life of the conditioning agent. The at least one chelating agent may be added during the saponification process. The at least one salt of a fatty acid may include between about 0 wt. % and 15 wt. % of glycerin. Zero to 5 wt. % of at least one anionic wetting agent such as sodium lauryl sulfate, linear alkylbenzene sulfonate, alcohol ethoxysulfates, and alkyl sulfates, and mixtures thereof, may be added to lower surface tension.

Other chelating agents include ethylenediaminetetraacetic acid (EDTA) or edetic acid in diammonium, tetraammonium, and disodium form, and acid forms including disodium ethylenediaminetetraacetate dihydrate and calcium ethylenediaminetetraacetate dihydrate, sodium gluconate, citric acid, triglycollamic acid, and diethylenetriaminepentaacetic acid, as examples. A sequestrant such as trisodium phosphate or sodium hexametaphosphate may also be added. Sequestrants function in a similar manner to chelating agents.

Antifreeze compounds may include ethanol, propylene glycol and calcium chloride.

Quantities of the above compositions applied to feed may be between about 0.5 oz. and approximately 160 oz. per ton of feed, with more typical amounts ranging between about 1 and about 2 oz. per ton of feed.

The above compositions may be added in amounts between about 1 wt. % and about 50 wt. % to other feed processing aids, such as flaking agents or pelleting aids containing sarsasaponin, yucca extracts, yucca Scidigera, mono diglycerides, lignin sulfonates, lecithin, ammonium chlorides, calcium chlorides, tri-sodium phosphate, surfactants, wetting agents chosen from alkyl-aryl sulfonates and ethylene oxide condensates such as poloxalene, and non-ionic surfactants such as polyoxyethylene sorbitan monooleate, as examples.

Commercially available salts of fatty acids may contain between about 0 wt. % and approximately 15 wt. % of glycerin, depending on the starting materials in the manufacturing process, and whether glycerin is added to the salts of fatty acids. Glycerin may be removed in the preparation of salts of fatty acids at the saponification stage by adding a brine solution.

TABLE 1 provides some of the specifications for the fatty acid salts used in EXAMPLES 1-7, hereinbelow.

TABLE 1

| Fatty acid salt | Potassium Cocoate | Potassium Oleate | Potassium mix of coconut oil and tall oil |
|---|---|---|---|
| Fatty Acid Source | Coconut oil Fatty Acid | Oleic acid (Commercial) | Coconut oil and Tall Oil |
| Titre of Fatty Acids (° C.) | 20 to 24 | 5 to 10 | 14-16 |
| Iodine Value of Fatty Acid | 7.5 to 10.5 | 90 | ~100 |
| Saponification Value of Fatty Acid | 250 to 264 | 200 | ~180 |
| Chain length of fatty acid(s) | C-8 to C-18-1 | C-18-1 | C-8 to C-20-22 |
| Predominant Chain Lengths | C-12 | C-18-1 | C-12 and C-18-2 |
| Percent Unsaturated C-18-1 | 5 to 8 | 75 to 85 | 30 to 40 |
| Percent Unsaturated C-18-2 | Trace to 2.5 | Trace to 5 | 2 to 4 |

It is believed that although salts of fatty acids made from high titer fats and oils (example 47° C.) will function in accordance with the present invention, the tested salts of fatty acids made from low titer fats and oils, for example, between 10° C. to 24° C., have been found to have good water solubility.

In the mechanical processing of whole grains (flaking/rolling/extrusion) or (pelleting/extrusion) of finely divided ground ingredients, increasing the production capacity of the equipment, and producing a harder, more durable product that survives handling with minimum breakage (fines) are sought since this leads to a reduction in unusable or wasted product, and a reduction in energy usage. As stated, the present invention also provides lubrication, as may be demonstrated by: (a) lower amperage for the same production speed, which means that less energy is required to produce the same quantity of product; and/or (b) increased production rate. Further, for any increase in production time, fixed costs, such as overhead and labor, as examples, increase production costs.

Reference will now be made in detail to the present embodiments of the invention, examples of which are illustrated in the accompanying drawings. In the FIGURES, similar structure will be identified using identical reference characters. It will be understood that the FIGURES are for the purpose of describing particular embodiments of the invention and are not intended to limit the invention thereto.

A. Grain Rolling & Flaking:

1. Dry Rolling (Dry Flaking or Crimping) Process:

FIG. 1A is a schematic representation of apparatus, 10, for dry rolling grains. Processing includes passing whole grains such as corn, rice, canola, barley, milo, oats, soya bean, wheat or other grains, as examples, through a set of rollers. The rollers flatten the grain which improves its nutritional availability. Water is normally added to improve the process since the addition of moisture reduces dust and softens the grain which increases the production capability of the equipment and improves the durability of the flaked grain. The added moisture also helps the process produce a thinner flake that further improves nutrient availability. In accordance with embodiments of the present invention, whole grain, 12, stored in main storage hopper, 14, (typically about 5,000 Tons capacity) is shown being directed into holding bin, 16, (typically about 1 Ton capacity) through leg, 18, using auger, 20, and then through rollers, 22, to produce rolled feed, 24. Small amounts (0.5 wt. % to 3 wt. %) of water from water source, 26, through water flow meter, 28, are added to the grains using sprayer, 30, before the rolling process. Conditioner, 32, of the present invention may be added into the water in pipe, 34, using variable speed pump, 36, and mixing valve, 38, upstream of sprayer 30 and before the rolling process. Typical soak times in bin 16 may be between 0 min. and about 30 min. In some embodiments, soak time may be minimized by passing whole grain 12 directly into rollers, 22, through leg 18, and past sprayer 30; that is, there is little time for the conditioner to be absorbed into the grain before rolling.

Figure 1B:
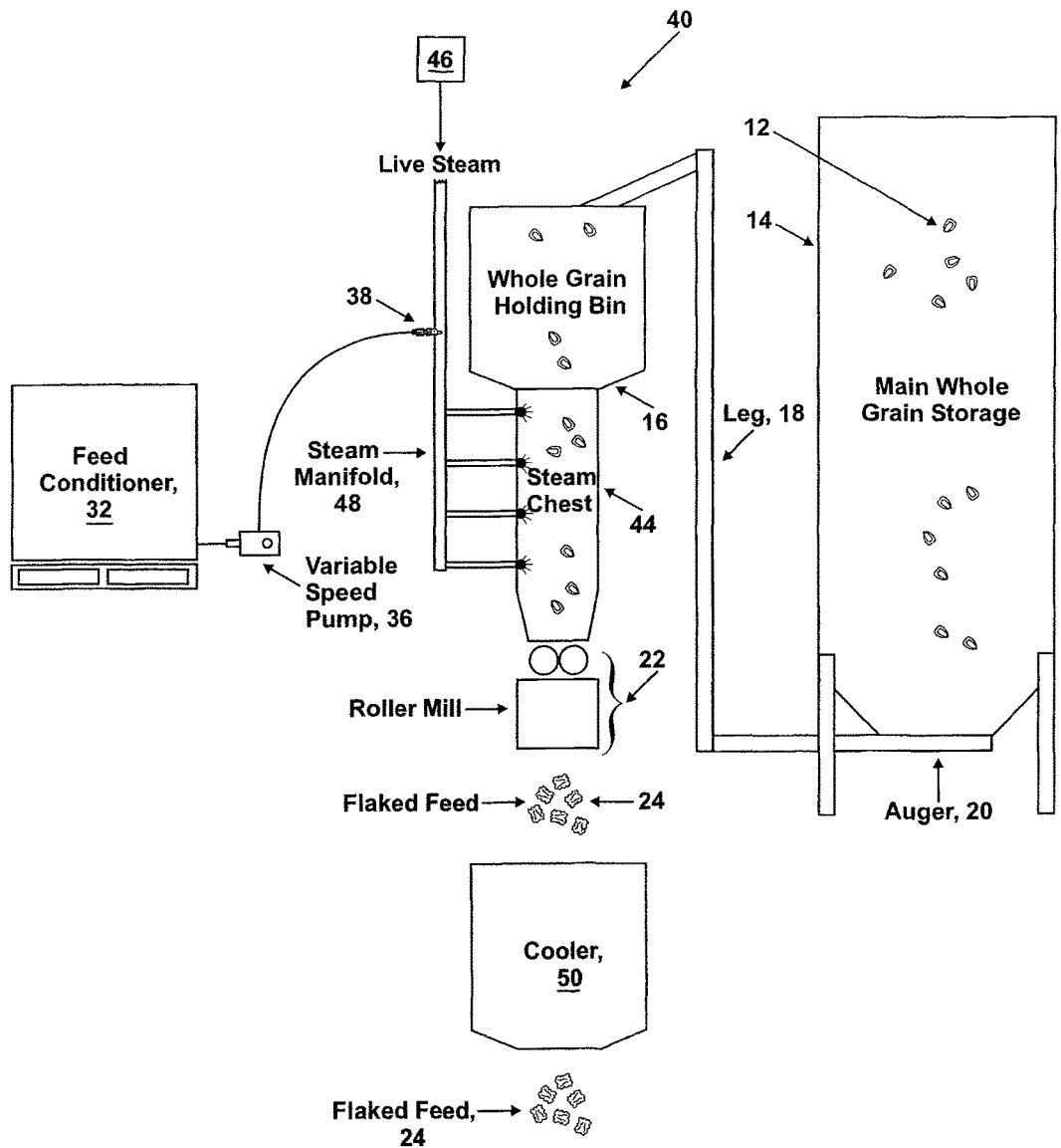
FIGS. 1B and 1C are schematic representations of apparatus for steam flaking whole grains with steam or with steam and water, respectively, before rolling, the present conditioner being added to the steam or added to the water, respectively.
Figure 1C:
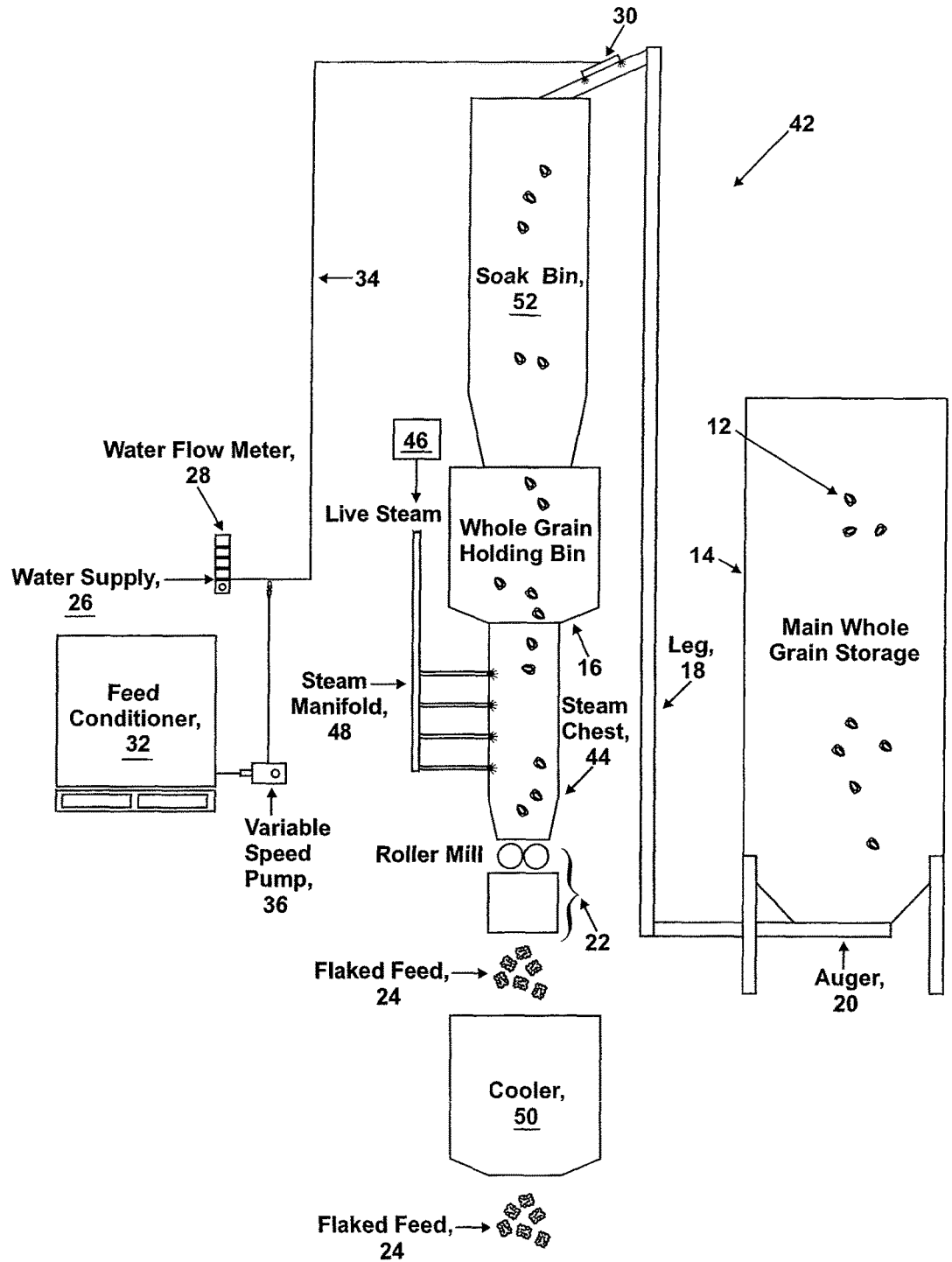

2. Steam Flaking Process:

FIGS. 1B and 1C are schematic representations of apparatus, 40, and 42, for treating whole grain with steam or steam and water, respectively, before rolling. Typically, steam chest, 44, into which live steam from source, 46, is introduced through steam manifold, 48, is disposed before whole grain 12 is admitted to roller mill 22. The grain enters the steam chest 44 and is heated to between about 150° F. and about 250° F. The steaming period in the chest may be between about 10 min. and approximately 120 min. The moisture level of the whole grain entering the steam chest may be between 10% and 14%; during steaming, between approximately 2 wt. % and about 3 wt. % of moisture may be added to the grain. The heated, higher-moisture content grain is then rolled. After rolling, the flattened or flaked grain may be directed though cooler, 50, for removing at least a portion of the added moisture, thereby preventing molding. Typically, the cooler may include a blower for directing ambient air over the rolled grain. In other steam chest operations such as shown in FIG. 1C, where higher moisture levels are desired in the grain, an additional processing step is used. A mill will add between about 1 wt. % and approximately 10 wt. % of water to the grain and place it in soak bin, 52, for allowing the moisture to be absorbed. The soak time may be between approximately 1 hr. and about 24 hr., after which the grain is directed to holding bin 16 which precedes steam chest 44. The whole grain then moves into steam chest 44 where it may be heated to between about 150° F. and about 250° F. for a period of between approximately 10 min. and about 120 min. with between about 2 wt. % and about 3 wt. % of additional moisture being added during steaming. The additional moisture and soak time further enhances the flake durability, and improves its nutritional availability. After rolling, the higher moisture flattened grain may be cooled to ambient temperature by blowing ambient air over it, as an example, and directly fed to animals, or packaged. Some drying of the flakes may occur during the cooling process. The present feed conditioner may be added to the steam or added to the water from source 32.

B. Pelleting Process:

Finely-divided feed ingredients including one or more of corn, soya bean meal, wheat, distillers grains, molasses, fats, oils, minerals, vitamins or other ingredients comprise a complete formulation or supplement. The formulation is placed in a mixer and blended, after which it is transferred to a holding bin above the pelleting apparatus, and subsequently directed into a steam conditioning chamber, where steam and or water are added, and may be heated by the steam to between about 100° F. and approximately 200° F., and the moisture level may reach 17%. The formulation then enters a pellet die where pellets are produced. After the pellets are formed, the hot material may be cooled by blowing ambient air over it, as an example, and fed to animals, or packaged. Once the pelleted formulation reaches ambient temperature, it may contain about 12 wt. % moisture.

Figure 2A:
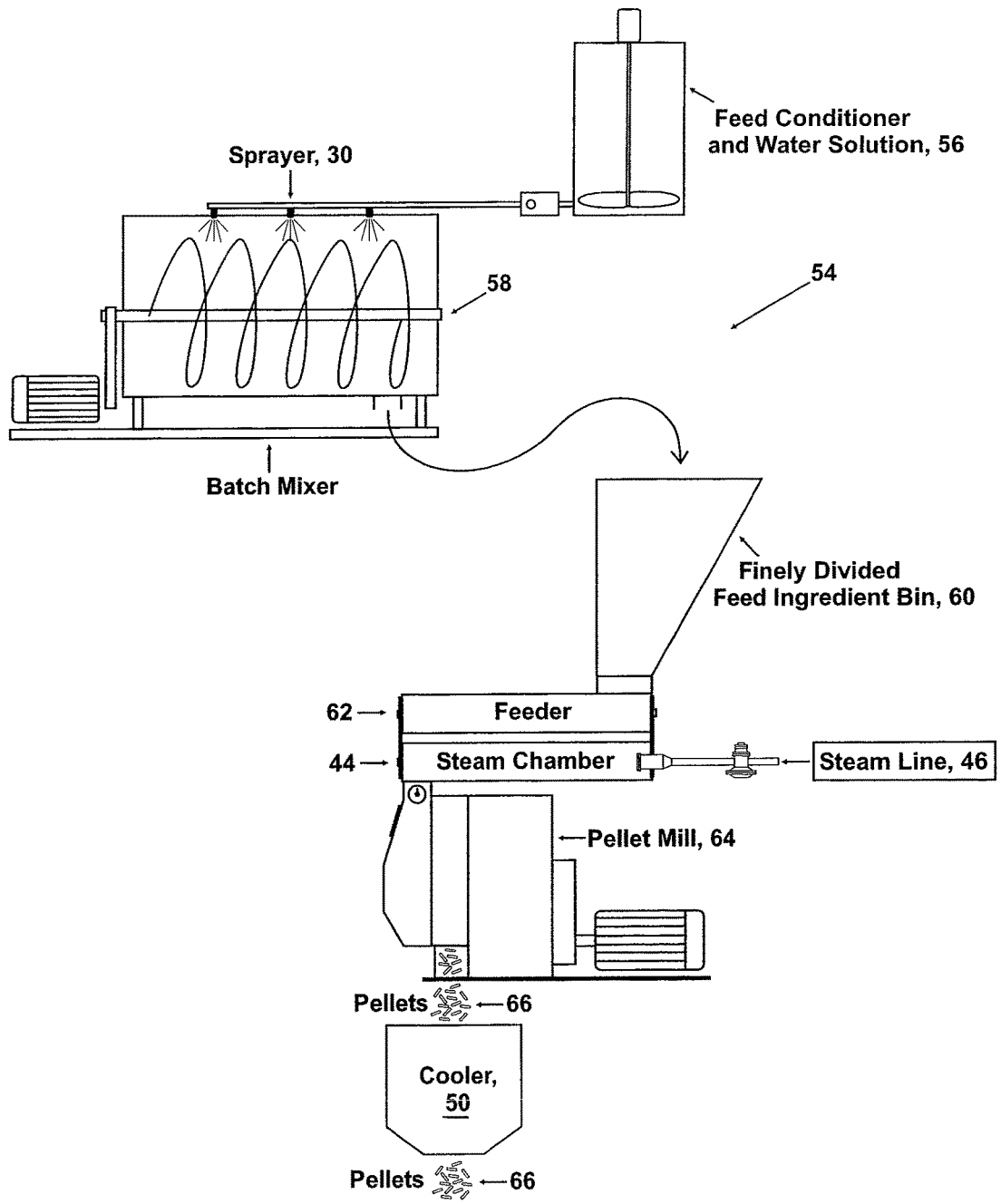
FIG. 2A is a schematic representation of a pelleting apparatus illustrating the addition of the conditioner and water to the batch mixer.
Figure 2B:
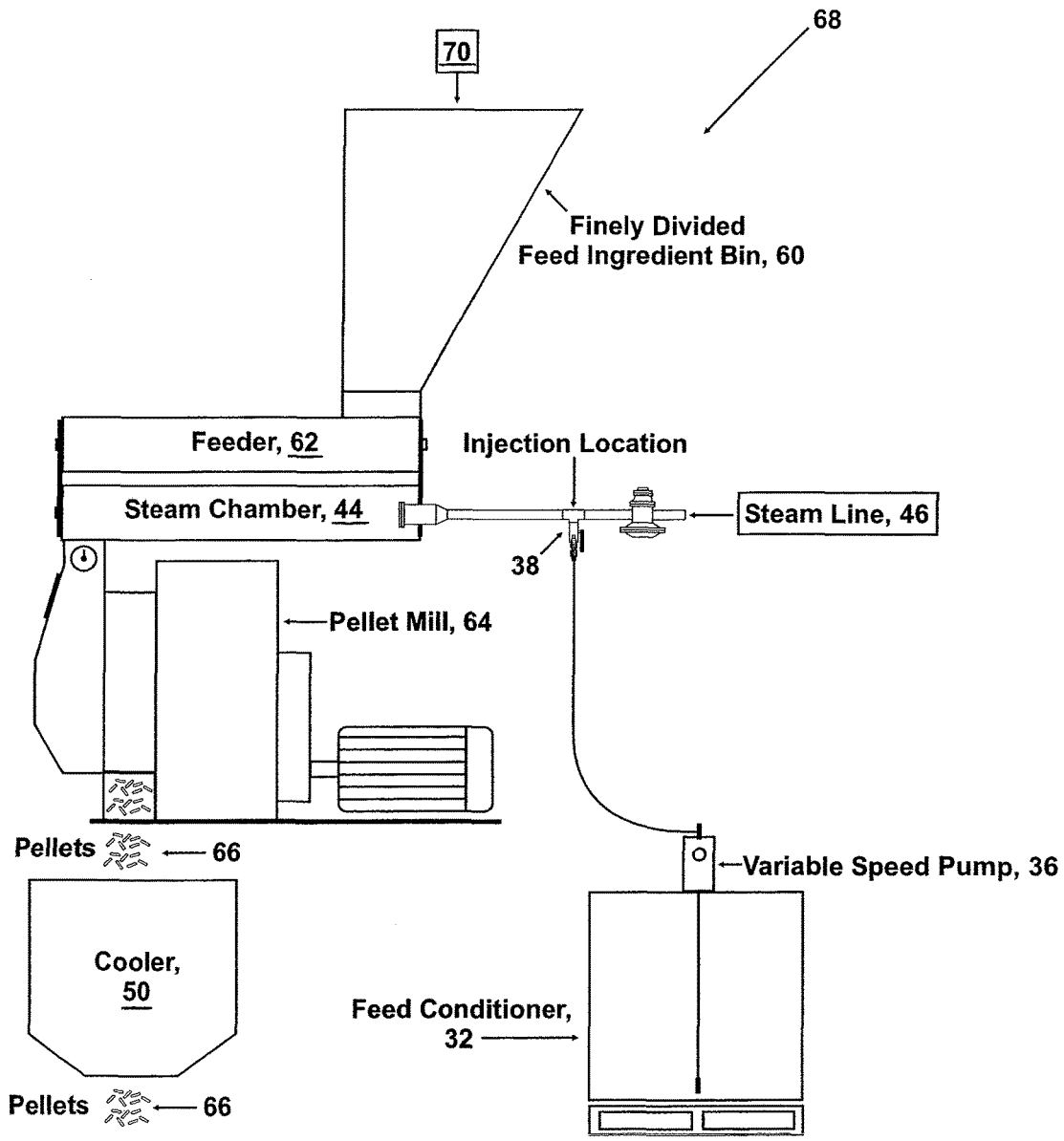
FIG. 2B is a schematic representation of a pelleting apparatus illustrating the addition of the present conditioner directly to the steam line entering the steam chamber.
Figure 2C:
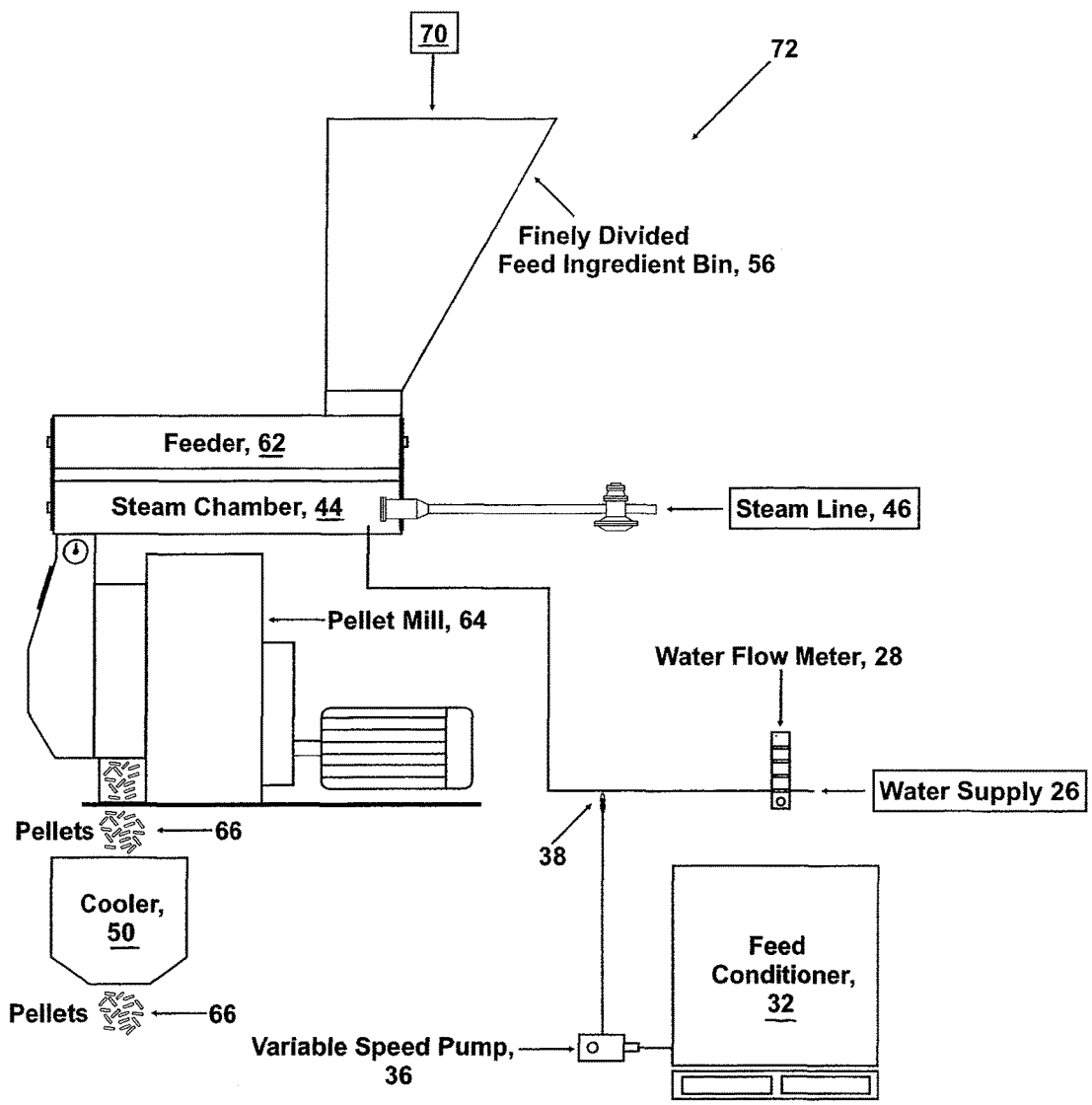
FIG. 2C is a schematic representation of a pelleting apparatus illustrating the addition of the present conditioner to water prior to introduction into the steam chamber.

FIG. 2A is a schematic representation of pelleting apparatus, 54, illustrating the addition of water solution of the present conditioner, 56, to batch mixer, 58, containing the finely divided ingredients, using sprayer 30. The resulting mixed batch is added to bin, 60, directed by feeder, 62, through steam chamber 44, into pellet mill, 64, wherein pellets, 66, are produced. Hot pellets 66 may be cooled by cooler 50 for storage. FIG. 2B is a schematic representation of pelleting apparatus, 68, illustrating the addition of the present conditioner 32 metered by variable speed pump 36 directly into steam line 46 entering steam chamber 44, ingredients, 70, being introduced into bin 60 unmixed with conditioner. FIG. 2C is a schematic representation of pelleting apparatus, 72, illustrating mixing of the present conditioner with water prior to introduction into steam chamber 44.

C. Extrusion Process:

A chosen formulation may comprise dry, finely-divided, ground ingredients including one or more of corn, soya bean meal, wheat, distillers' grains, fish meal, meat meal, molasses, fats, oil, minerals, vitamins, as examples, or other feed ingredients. The formulation is placed in a batch mixer and mixed, and subsequently transferred to a holding bin above the extrusion apparatus. The formulation is directed into a steam conditioning chamber where steam and/or water are introduced, and may be heated to between about 160° F. and approximately 200° F. and the moisture level may reach about 25 wt. %. The formulation is then passed into a high-pressure extruder where high-pressures and temperatures reaching about 350° F. are generated, after which the formulation is passed though a die. Pellets or nuggets are formed, and the hot material passes though a heated dryer/cooler to remove moisture. The pellets or nuggets are cooled to ambient temperature, for example, by blowing ambient air over the material, and may include about 12 wt. % of water.

Figure 3A:
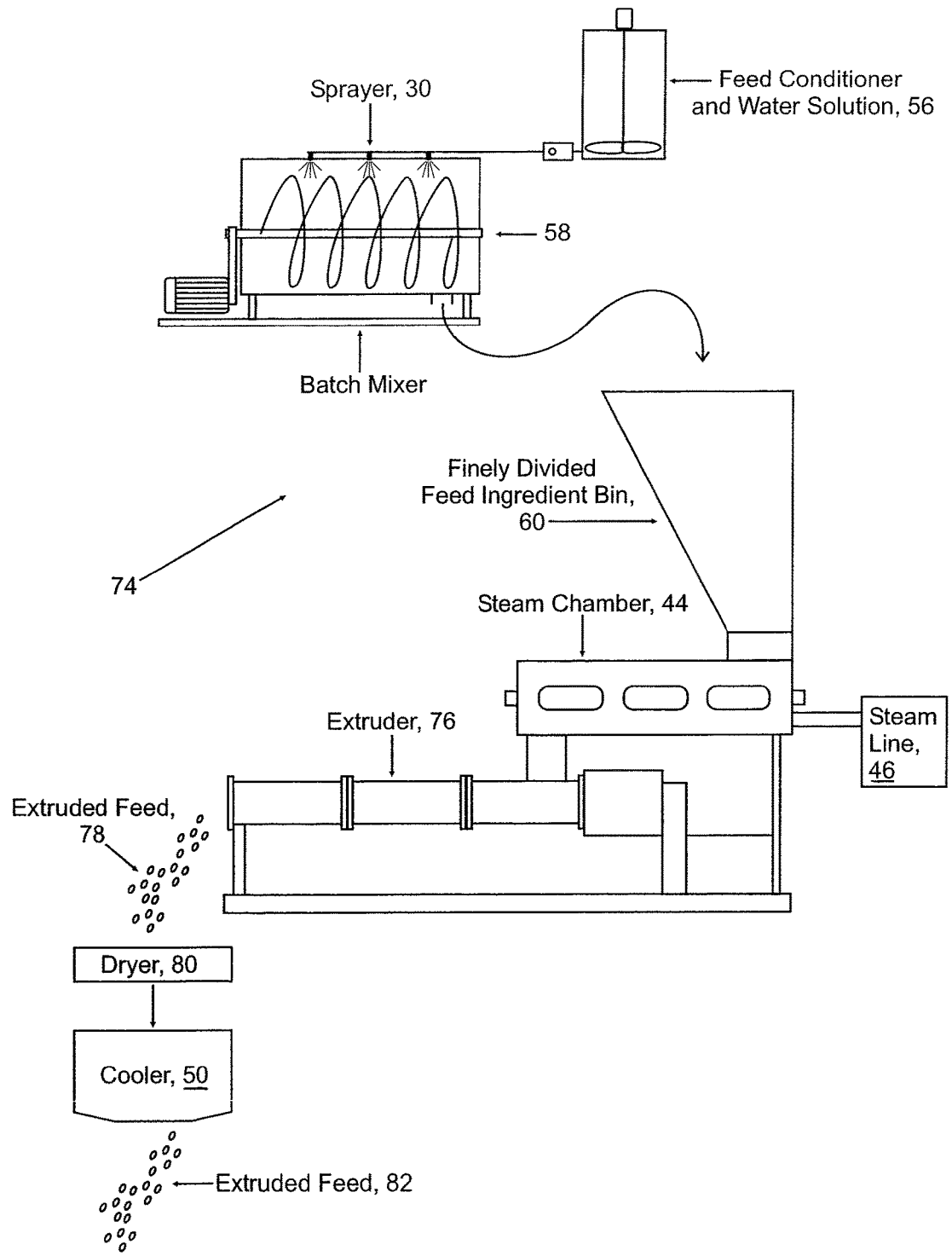
FIG. 3A is a schematic representation of an extrusion apparatus illustrating the addition of the present tempering agent or grain conditioner and water to the batch mixer.
Figure 3B:
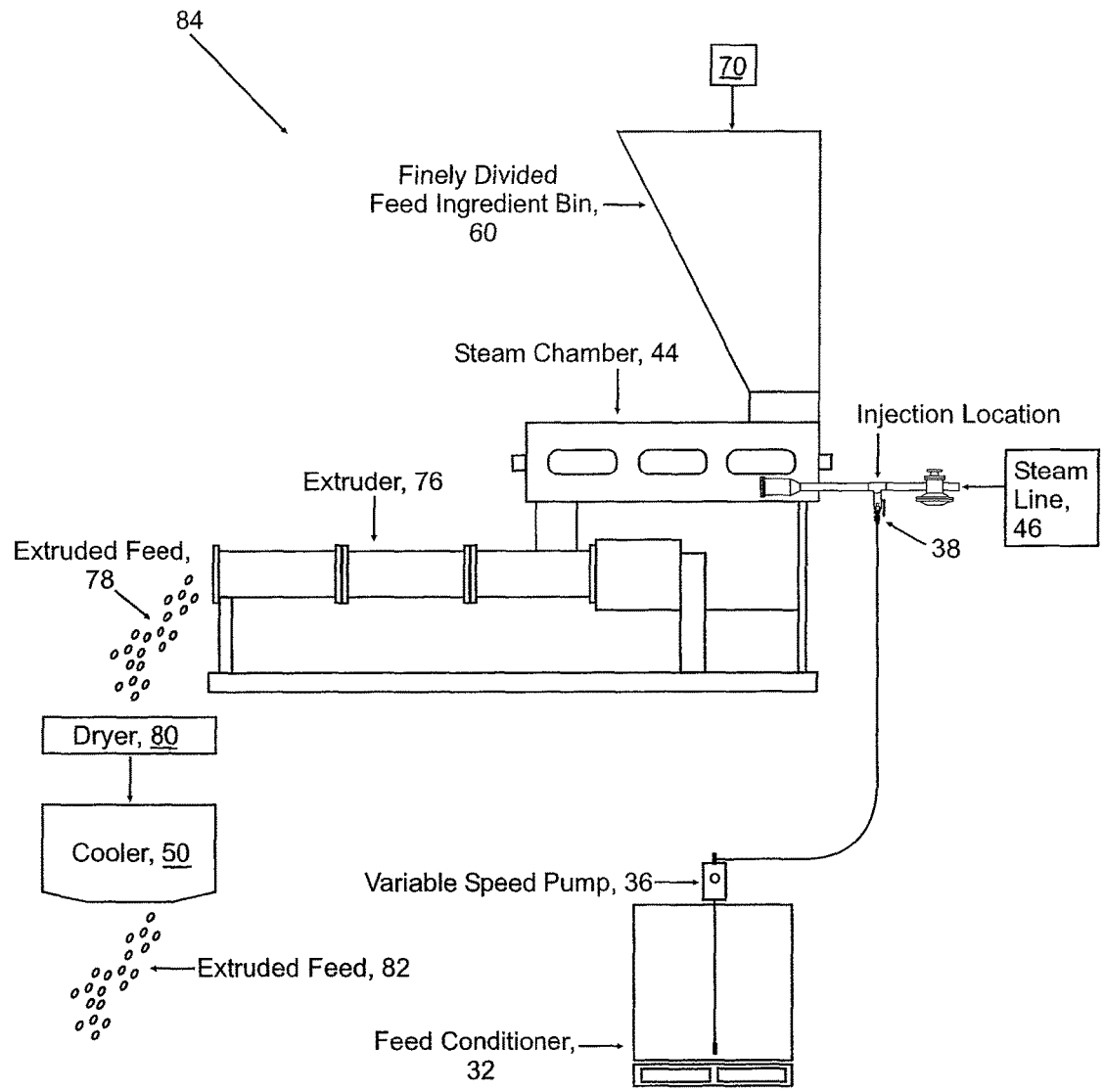
FIG. 3B is a schematic representation of an extrusion apparatus illustrating the addition of the present conditioner directly into the steam line entering the steam chamber.
Figure 3C:
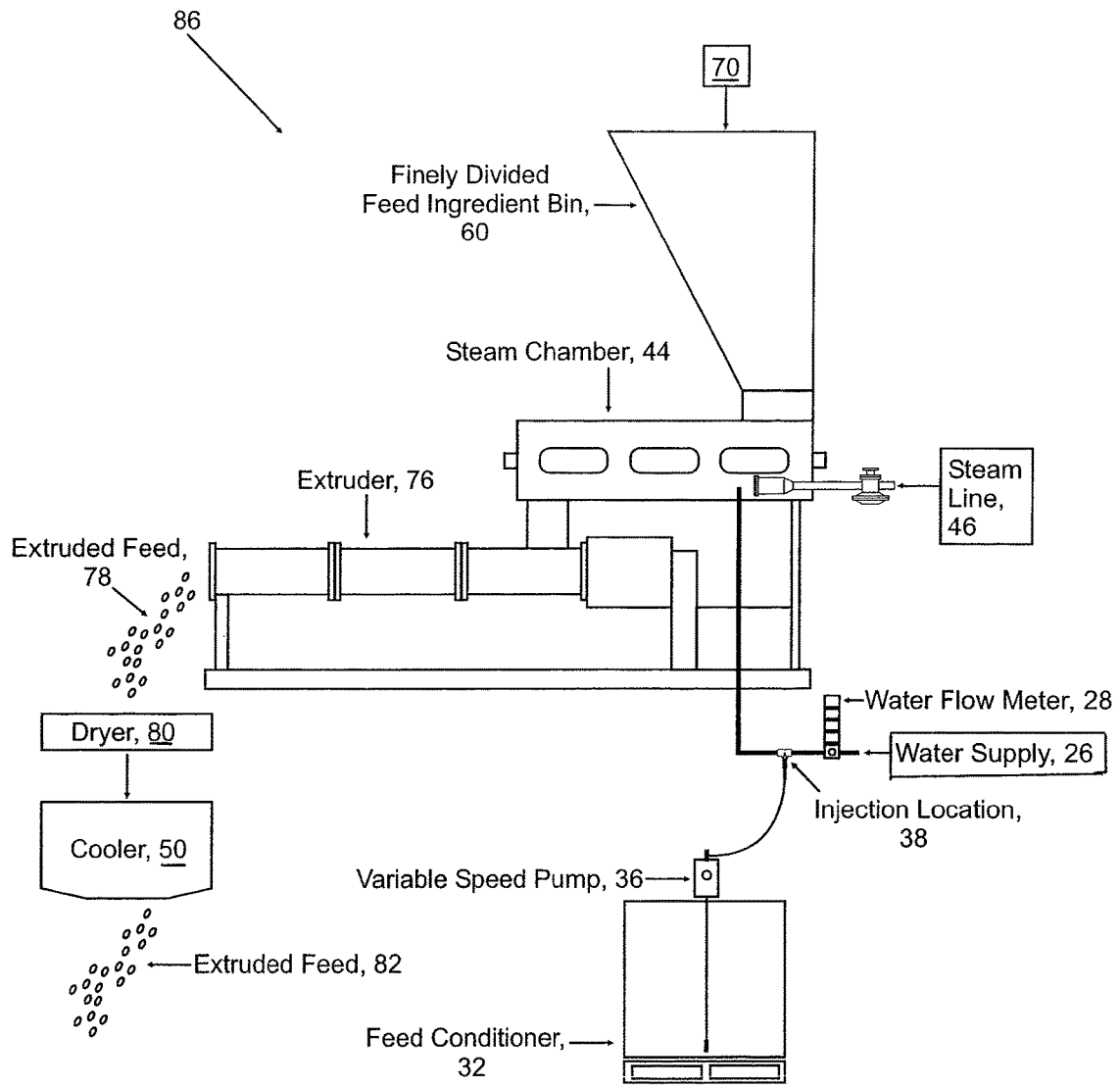
FIG. 3C is a schematic representation of an extrusion apparatus illustrating the addition of the present conditioner to water prior to introduction into the steam chamber.

FIG. 3A is a schematic representation of extrusion apparatus, 74, illustrating the addition a solution of the present conditioner and water 56 to batch ingredient mixer 58 using sprayer 30, before the ingredients are loaded into bin 60. After passing through steam conditioning chamber 44, and high-pressure extruder, 76, extruded feed, 78, is produced. Extruded feed 78 is then passed through heated dryer, 80, to remove moisture, and cooler 50 to bring the heated extruded feed to ambient temperature feed, 82. FIG. 3B is a schematic representation of extrusion apparatus, 84, illustrating the addition of the present conditioner directly into the steam line entering the steam chamber. FIG. 3C is a schematic representation of extrusion apparatus, 86, illustrating the addition of the present conditioner to water prior to introduction into the steam chamber.

Having generally described the present invention, the following EXAMPLES are set forth to provide additional details.

EXAMPLE 1

Salts of Fatty Acids Soak Test

To demonstrate moisture absorption of corn when treated with water and salts of fatty acids, 20 g of cleaned corn was placed in a 50 ml test tube, and 37.5 g of distilled water and 0.19 g (0.5% by weight) of a salt of fatty acids were mixed and poured onto the corn. After 2 h, the corn was removed and excess water removed and weighed. The difference in weight illustrates the wt % moisture absorbed, and is set forth in TABLE 2.

TABLE 2

| Feed Conditioner | Percent Added Moisture | % Improvement - additional amount of water absorbed |
|---|---|---|
| Distilled Water - no additives | 3.80% | |
| Potassium Cocoate 35 wt %; Distilled Water 65 wt % | 4.33% | 13.9% |
| Potassium Oleate 35 wt %; Distilled Water 65% | 4.35% | 14.5% |
| Potassium Salts of Coconut Oil and Tall Oil Fatty Acids 35 wt %; Distilled Water 65 wt % | 4.40% | 15.8% |

The results shown in TABLE 2 demonstrate the ability of the present tempering agents to increase the quantity of water absorbed by the corn. In addition to the lubrication properties of the salts of fatty acids by themselves, corn with higher moisture content is softer and therefore less energy is required for the corn to pass between the flaking roll or die, thereby saving money and resources.

EXAMPLE 2

Salts of Fatty Acids Flaking Grain Test

To demonstrate the improved moisture absorption, reduced soak time, lower current required and generation of hard, durable corn flakes, fifty tons of control (no additives) corn was sprayed with 5.4 wt % water (108 lb) per ton of corn, and placed in a soak bin. The sprayed corn was allowed to soak for 12 h prior to flaking. The corn was processed and the roller mill amperage, flake moisture, and flake durability were recorded. Another 50 tons of corn were sprayed with a mixture of 2.0 ounces of Composition A (35 wt % potassium cocoate and 65 wt % of water) mixed with 4.68% (93.6 lb) of water per ton of corn and placed in a soak bin. The treated corn was allowed to soak for 3 h. The corn was then processed and the roller mill amperage, flake moisture and flake durability were recorded. A third 50 ton sample of corn was treated with a mixture of 2.0 ounces of Composition B (35 wt % of potassium salts of coconut oil and tall oil fatty acids and 65 wt % of water) mixed with 4.91% (98.2 lb) of water per ton of corn and placed in a soak bin. The treated corn was allowed to soak for 3 h. The corn was then manufactured and the roller mill amperage, flake moisture and flake durability were recorded, as set forth in TABLE 3.

TABLE 3

| Feed Conditioner | Bin Soak Time | Amperage | Flake Moisture | Flake Durability |
|---|---|---|---|---|
| Water only | 12 h | 99.25 | 19.01 wt % | 92.15 wt % |
| Composition A plus water | 3 h | 89.25 | 19.24 wt % | 94.00 wt % |
| Composition B plus water | 3 h | 89.35 | 19.19 wt % | 94.90 wt % |

The results in TABLE 3 demonstrate that both types of salts of fatty acids reduced the corn soak time, which enables the processor to produce more flaked corn in the same amount of time. It is interesting to note that this invention allowed more moisture absorption in a much shorter time period. Because the corn absorbed more moisture due to the invention, the roller mill amperage was lower saving energy and processing costs. Most surprising is that both salts of fatty acids produced a durable hard flake, meaning less product loss.

EXAMPLE 3

Salts of Fatty Acids Pelleting Test

To demonstrate the improved pellet production rate and improved pellet hardness or durability on a dairy feed, a 4 ton batch of dairy feed formula was prepared with no additives. The pellet mill amperage, tons/hr processed, and pellet hardness or durability was tested. A second 4 ton batch of dairy feed formula was prepared with 1.0 ounce of the present conditioner per ton (composition: 31 wt. % of potassium cocoate, with 58 wt. % water (as purchased), 10 wt. % propylene glycol, and 0.3 wt. % sodium gluconate). The conditioner was added directly into the steam line with no further dilution of water. The pellet mill amperage, tons/hr. produced, and pellet hardness or durability were measured. The results are shown in TABLE 4.

TABLE 4

| Feed Conditioner | Current (A) | Tons/hr | Pellet Hardness |
|---|---|---|---|
| Control (no additive) | 140 | 5.85 | 96.0 |
| Potassium Cocoate mixture | 135 | 7.50 | 98.0 |

TABLE 4 illustrates that the potassium cocoate mixture reduced the pellet mill amperage, increased the pellet production rate, and produced a harder more durable pellet. A harder more durable product handles well with minimal breakage (fines) which leads to unusable or wasted product that the animal or human cannot consume. The improved lubricity of the product enabled (a) lower amperage at a higher production speed, thereby requiring less energy to produce more of product; and (b) the manufacturer to produce more tons/hour by increasing production speed. Producing a greater number of tons per hour means lower production costs per ton of product since there are fixed costs such as overhead and labor, as examples, which add to the total cost. The processing apparatus also operates with improved efficiency. In some situations, both lower amperage and a higher production rate have both been achieved. The freezing point of the present conditioner was observed to be lower as a result of the addition of the propylene glycol. The commercial salts of fatty acids comprised a mixture of 35 wt % of fatty acid and 65 wt % of distilled water.

EXAMPLE 4

Salts of Fatty Acids Extrusion Test

An 8-ton batch of fish formula was prepared with no additive. Water was added in the extruder steam conditioner at 296 lbs (14.8%) per ton. The extruder amperage, tons per hr produced, and pellet/nugget density were measured. Another 8-ton batch of fish formula was prepared with 32 ounces per ton of potassium cocoate mixture (composition: 31 wt % of potassium cocoate, 58 wt % water (as purchased), 10 wt % propylene glycol, and 0.14 wt. % of disodium ethylenediaminetetraacetate dihydrate) mixed with 40 lbs (2% by weight per ton of fish formula) of water. This mixture was added into the mixer before prior to processing in the extruder. Additional water 256 lbs (12.8 wt %) was added in the extruder steam conditioner. (Total water added to both batches equaled 14.8 wt %). The extruder amperage, tons per hr produced, and pellet/nugget density were measured. The results are shown in TABLE 5.

TABLE 5

| Feed Conditioner | Amperage | Ton/hr | Nugget Density |
|---|---|---|---|
| Control (no additive) | 267 | 4.3 | 385 |
| Potassium Cocoate mixture | 270 | 5.0 | 386 |

The results in TABLE 5 illustrate that potassium cocoate mixture increased the ton/hr. produced using the same current, while maintaining a chosen density of the nuggets. The importance of maintaining nugget density in an extrusion process is that a change in nugget density means that the product will no longer properly fit into the packaging which is labeled as having a particular weight.

EXAMPLE 5

Other Salts of Fatty Acids

Figure 4A:
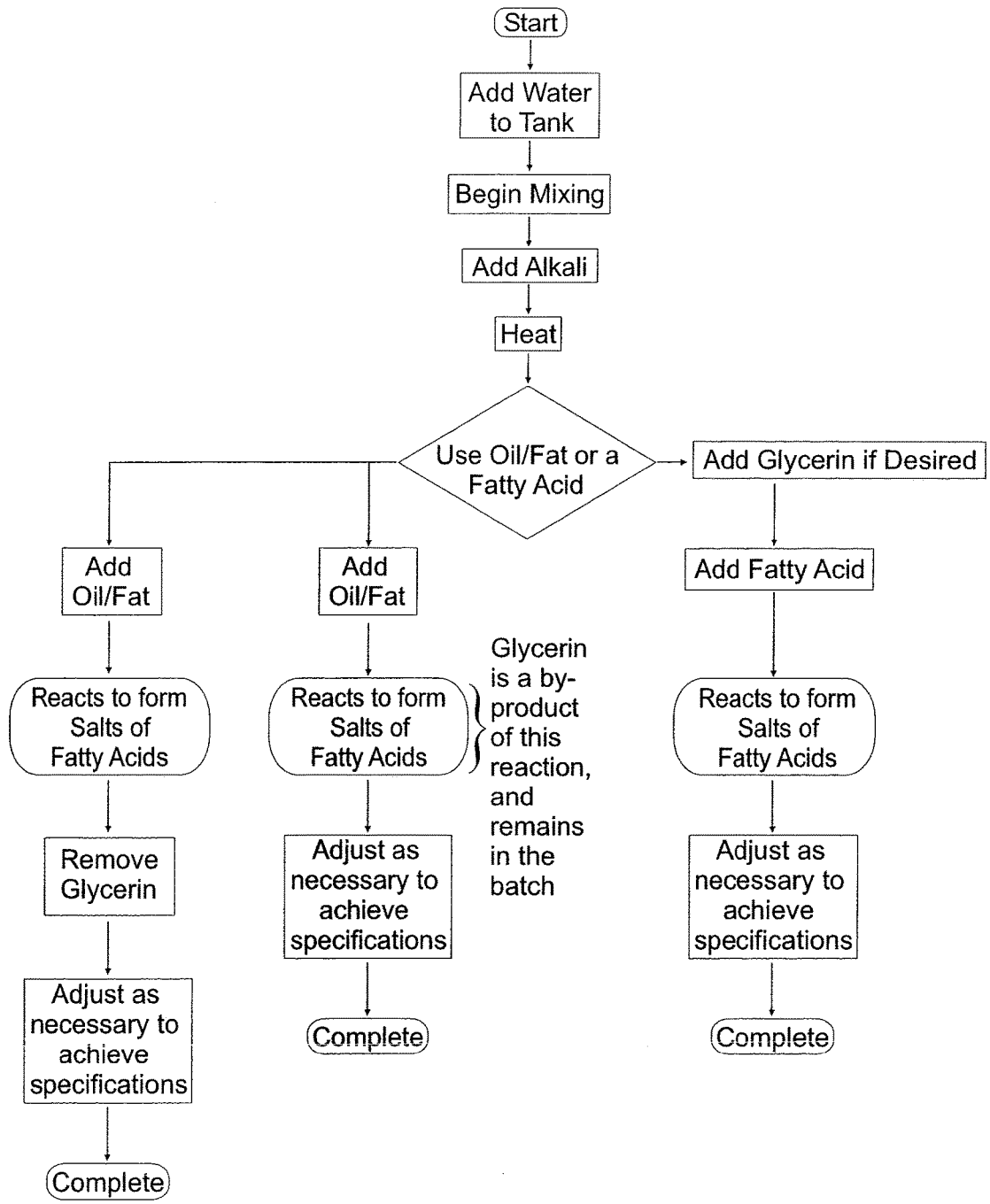
Figure 4B:
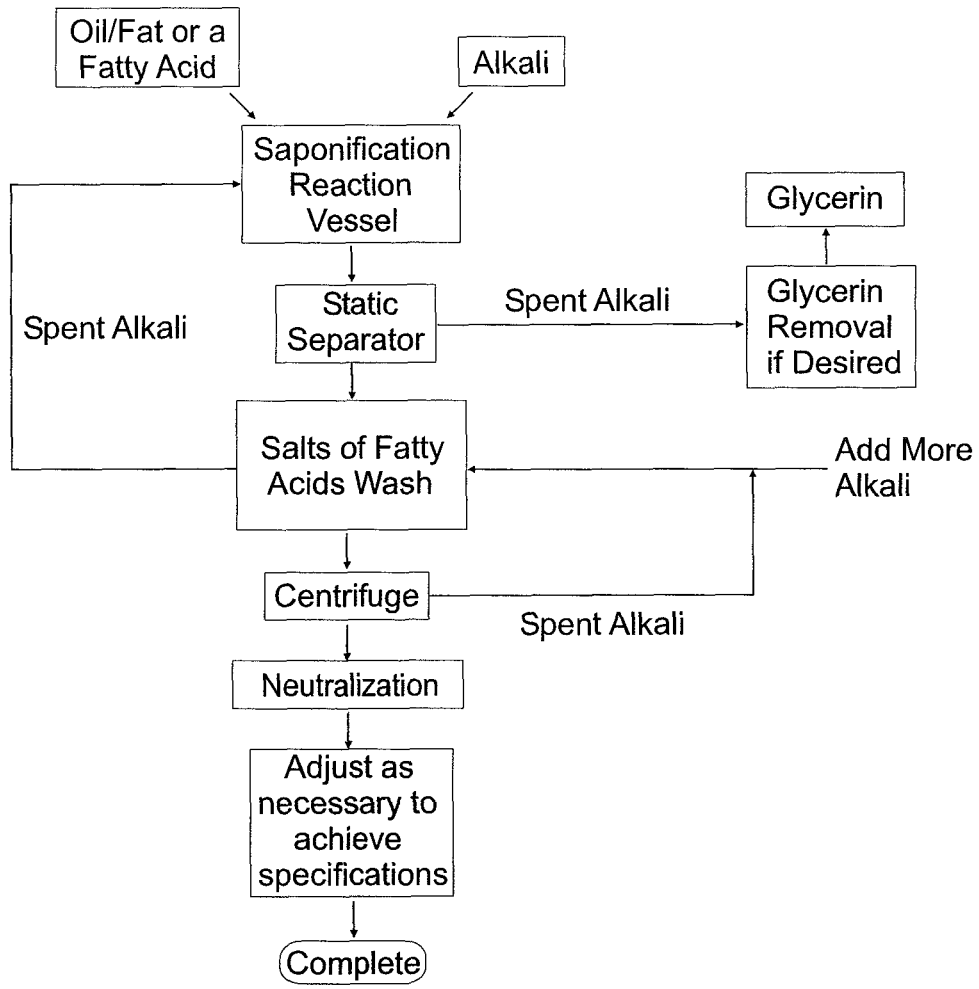

The salts of the common fatty acid component of the additive are monocarboxylic salts corresponding to the general formula: $(RCOO)_n X$, where R is an aliphatic hydrocarbon containing 8-24 carbon atoms, advantageously between 10 and 20 for improved solubility, X is ammonium, potassium or sodium, and n=1, when starting with fatty acids, or 3, if starting with triglycerides. Chains longer than 20 carbon atoms have poor solubility, and chains shorter than 12 carbon atoms provide little lubricity. Suitable fatty acid salts may be prepared from fatty acids found in animal fat, such as lard or tallow, or combinations thereof. Salts derived from fatty acids found in vegetable oils, such as soy, coconut, olive, rapeseed, cottonseed, palm kernel, corn oil, and palm oils are advantageous, as may be fatty acids found in tall oil. FIG. 4A is a flow diagram illustrating batch preparation of soluble salts of fatty acids. Water and alkali (ammonium hydroxide, potassium hydroxide, or sodium hydroxide, or mixtures thereof, as examples) are mixed and heated. The oil/fat or a fatty acid is added to the alkali solution, the mixture being heated, such that reaction or saponification takes place. Glycerin may remain in the reaction products, may be removed or additional glycerin added to achieve desired results. FIG. 4B is a flow diagram illustrating continuous flow preparation of soluble salts of fatty acids. A mixture of oil/molten fat or a fatty acid and alkali (ammonium hydroxide, potassium hydroxide, or sodium hydroxide, or mixtures thereof, as examples) is pumped into a reaction (saponification for the oils and molten fats, and neutralization for the fatty acids) vessel. High pressure steam may be injected. Glycerin may be separated (removed) from the saponified oil/fat/fatty acid, may be permitted to remain with the reaction products, or the concentration of glycerin may be otherwise adjusted to achieve desired results. A portion of the alkali may be removed during a washing step, while additional alkali may be removed by centrifugation. The salts of fatty acids may then be neutralized.

As stated hereinabove, dry or liquid salts of fatty acids may be used directly on feed materials without water in amounts between 0.2 oz. and 160 oz. per ton of feed. If water is added, the amount of water used is chosen to suit particular applications.

EXAMPLE 6

Performance of Salts of Fatty Acids in Hard Water

In some feed processing applications, hard water is utilized. Hard water contains mineral salts (principally salts of calcium and magnesium, but may also include other minerals such as iron and manganese). The mineral salts may react with salts of fatty acids to form insoluble precipitates. However, when the salts of fatty acids remain soluble, surface tension remains low and is thus remains available to increase moisture absorption in feedstuffs. In the following, the surface tension of various liquids was measured using a tensiometer. Two readings were taken, and an average tensiometer reading was determined.

The following list demonstrates the degree of surface tension provided by chosen salts of fatty acids when exposed to hard water. Solutions were prepared using 0.267 wt. % salts of fatty acids by weight, and the surface tension in dynes recorded. The hard water sample used measured 240 mg/L on a hardness scale, which is classified as very hard water, at a temperature of 56° F., and the results are set forth in TABLE 6.

TABLE 6

| Wt. % of Salt of Fatty Acid | Surface Tension (Dynes) |
| --- | --- |
| 100% potassium cocoate | 48.0 |
| 100% potassium oleate | 30.0 |
| 99% potassium cocoate 1% potassium oleate | 43.5 |
| 90% potassium cocoate 10% potassium oleate | 37.4 |
| 80% potassium cocoate 20% potassium oleate | 36.0 |
| 50% potassium cocoate 50% potassium oleate | 33.0 |

It may be observed that salts of fatty acids made from oils that contain high levels of unsaturated fatty acids are more tolerant to hard water, as illustrated by lower surface tension numbers. Potassium cocoate contains 5-8 wt. % C-18-1 and 0 to 2.5 wt. % C-18-2 (10.5% unsaturated), whereas potassium oleate contains between 75 wt. % and 85 wt./% C-18-1 and 0 to 5 wt. % C-18-2 (90% unsaturated). When potassium oleate was added to potassium cocoate, surface tension was reduced. As mentioned above, a surfactant may be added to further lower the surface tension. Salts of fatty acids having greater solubility permit utilization of the feed conditioner of the present invention in cold water.

EXAMPLE 7

Surface Tension Reduction of Commercially Available Grain Conditioners

The addition of the salts of fatty acids of the present invention was found to reduce the surface tension of several commercially available grain conditioners when added to water. As stated above, surface tension reduction in water has a direct correlation to moisture penetration into grain during processing. The term "SEA" means salts of fatty acids. The grain conditioners were tested at a dilution of 0.10 wt. % in distilled, ambient-temperature water (25° C.). The surface tension results for potassium oleate and potassium cocoate alone are provided in TABLE 7.

TABLE 7

| SOLUTION | SURFACE TENSION (DYNES) |
| --- | --- |
| Potassium oleate 0.10% (0.04% active SFA) | 28.86 |
| Potassium cocoate 0.10% (0.04% active SFA) | 33.16 |

It was observed that the commercial conditioners had surface tension values between about 55 and 70 Dynes. Addition of potassium cocoate reduced the surface tension of these compositions to between about 35 and 41 Dynes. It is to be observed that potassium oleate (a more water soluble salt with a higher percentage of unsaturated fatty acids) has a lower surface tension than potassium cocoate.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. A method for conditioning whole grain animal feed comprising the steps of:
   contacting at least one water-soluble salt of a fatty acid capable of penetrating said animal feed, with said animal feed in the absence of hydrogenated lipids, and in the absence of anionic polymers, forming a mixture;
   introducing steam into the mixture; and
   mechanically processing the steam-heated mixture.

2. The method of claim 1, further comprising the step of diluting the at least one water-soluble salt of a fatty acid with water forming a solution, before said step of mixing the at least one water-soluble salt of a fatty acid with said animal feed.

3. The method of claim 1, wherein said step of contacting the salt of a fatty acid with said animal feed comprises spraying the salt of a fatty acid onto said animal feed.

4. The method of claim 1, wherein said step of mechanically processing the mixture comprises steam flaking, forming thereby flaked feed.

5. The method of claim 4, further comprising the step of cooling the flaked feed.

6. The method of claim 1, wherein said at least one salt of a fatty acid is prepared by saponification of at least one vegetable oil or tall oil, or neutralization of a fatty acid of at least one vegetable oil or tall oil.

7. The method of claim 6, wherein the at least one vegetable oil is chosen from coconut oil, corn oil, cottonseed oil, palm kernel oil, palm oil, palm oil oleate, rapeseed oil, safflower oil, soybean oil, and sunflower oil, and mixtures thereof.

8. The method of claim 6, wherein the at least one fatty acid comprises an unsaturated fatty acid.

9. The method of claim 8, wherein the at least one unsaturated fatty acid is chosen from oleic acid and linoleic acid.

10. The method of claim 1, wherein said at least one salt of a fatty acid is prepared by saponification of at least one fat or neutralization of a fatty acid of at least one fat.

11. The method of claim 10, wherein said at least one fat is chosen from tallow, lard and grease.

12. The method of claim 1, wherein the at least one salt of a fatty acid further comprises at least one antifreeze composition.

13. The method of claim 12, wherein the antifreeze composition is chosen from ethanol, propylene glycol, and calcium chloride, and mixtures thereof.

14. The method of claim 1, wherein the at least one water-soluble salt of a fatty acid further comprises at least one chelating agent.

15. The method of claim 14, wherein the at least one chelating agent is chosen from disodium ethylenediaminetetraacetate dihydrate, ethylenediaminetetraacetic acid, calcium ethylenediaminetetraacetate dihydrate, sodium gluconate, citric acid, triglycollamic acid, and diethylenetriaminepentaacetic acid, and mixtures thereof.

16. The method of claim 1, wherein the at least one salt of a fatty acid further comprises at least one anionic wetting agent.

17. The method of claim 16, wherein the at least one anionic wetting agent is chosen from sodium lauryl sulfate, linear alkyl benzene sulfonates, alcohol ethoxysulfates, and alkyl sulfates, and mixtures thereof.

18. The method of claim 1, wherein the at least one salt of a fatty acid comprises a cation chosen from ammonium, potassium, and sodium ions, and mixtures thereof.

\* \* \* \* \*